United States Patent
Kaufman

[11] 4,074,870
[45] Feb. 21, 1978

[54] FILM RETRIEVAL DEVICE

[76] Inventor: Marshall Kaufman, 413 W. 56th St., New York, N.Y. 10019

[21] Appl. No.: 707,654

[22] Filed: July 22, 1976

[51] Int. Cl.$^2$ .......................... B25B 9/00; G03B 1/02
[52] U.S. Cl. ......................................... 242/1; 81/3 R; 242/71.1
[58] Field of Search ...................... 242/1, 71.1, 55, 77; 81/3 R; 226/91

[56] References Cited

U.S. PATENT DOCUMENTS

| 1,508,287 | 9/1924 | Moran | 81/3 R |
| 3,261,237 | 7/1966 | Sentiff | 81/3 R |
| 3,864,993 | 2/1975 | Hovind | 81/3 R |

*Primary Examiner*—George F. Mautz
*Attorney, Agent, or Firm*—Lawrence E. Sklar

[57] ABSTRACT

A film retriever for and a method of retrieving a free end of a convolutely wound film from inside a cylindrical cassette through an exit opening in a circumferential wall on said cassette. The retriever comprises a first, upper, then, flexible, springy strip of material having an anterior tongue portion of a length slightly less than the interior circumference of the cassette and a wider, longer posterior portion, said posterior portion having a pair of spaced, parallel slots. The retriever further comprises a second, lower, thin, flexible, springy strip of material having a curled, anterior tongue portion of a length slightly less than the interior diameter of the cassette and a wider, longer posterior portion having tabs therein which slidingly engage the slots of the first posterior portion.

The method comprises inserting the two-part retriever into the cassette through the exit opening, arranging the flexible strips within the cassette so that the upper strip lies adjacent most of the interior cylindrical wall of the cassette, while the curled, anterior tongue portion of the lower strip forms a film-receiving channel with the upper strip adjacent the exit opening, rotating the protruding hub of the cassette counterclockwise until the free end of the film passes the end of the curled, anterior tongue portion, rotating the protruding hub clockwise until said hub can no longer be turned, and then withdrawing the upper and lower components while simultaneously turning the protruding hub clockwise.

10 Claims, 19 Drawing Figures

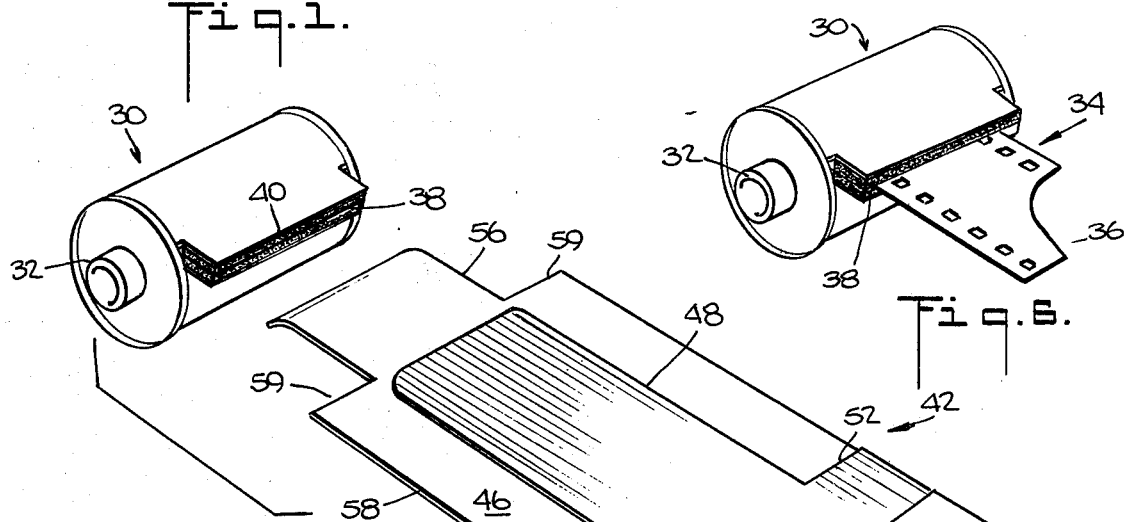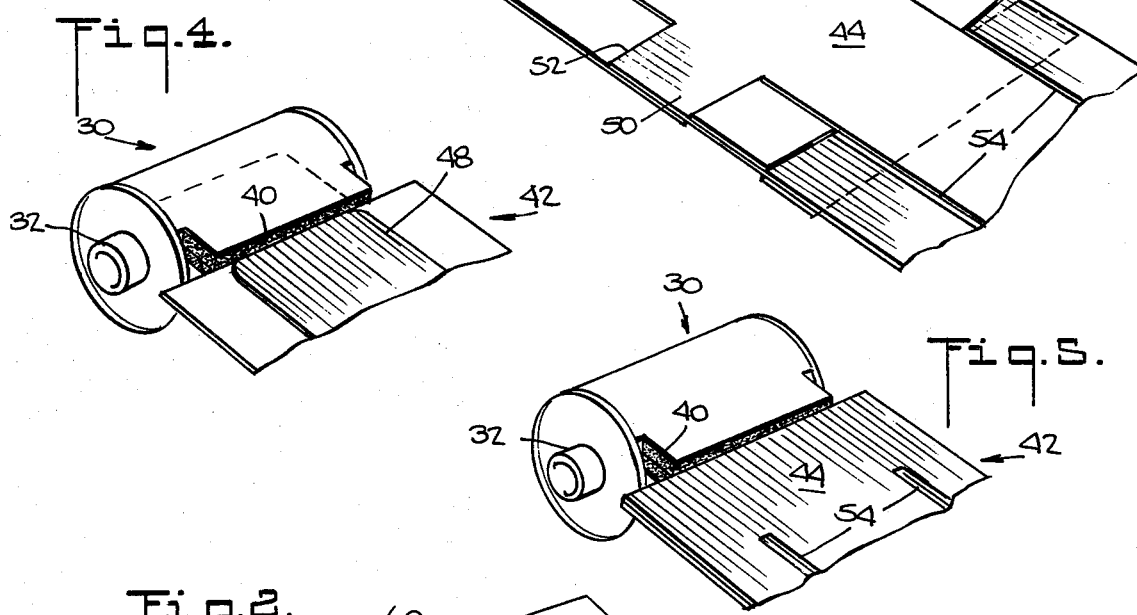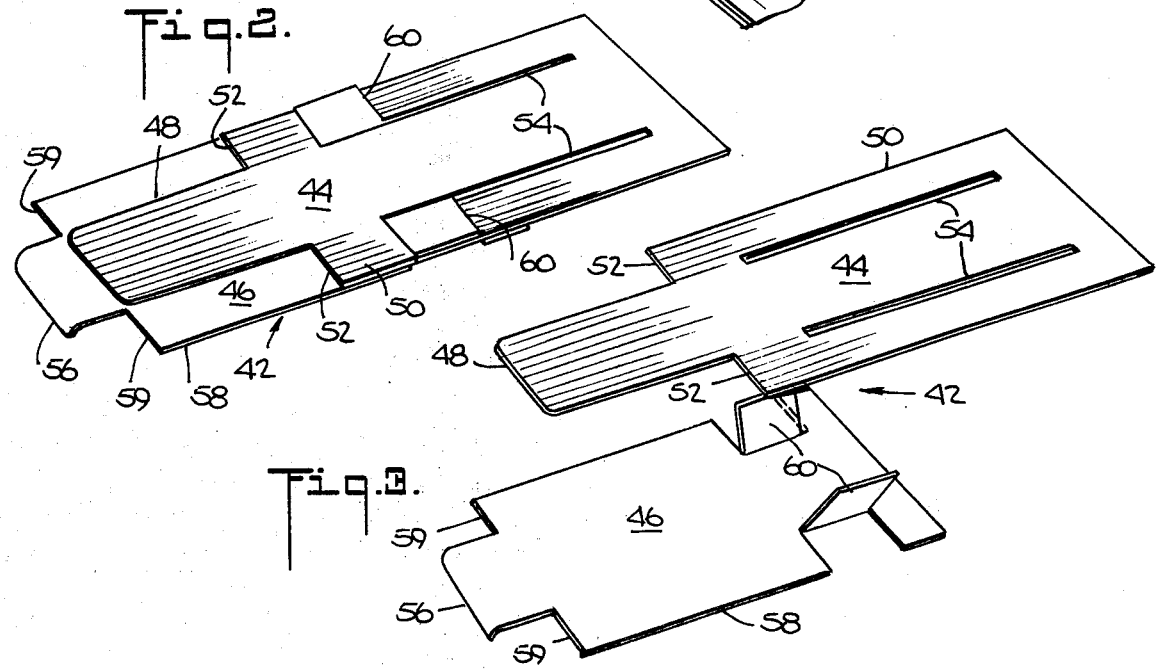

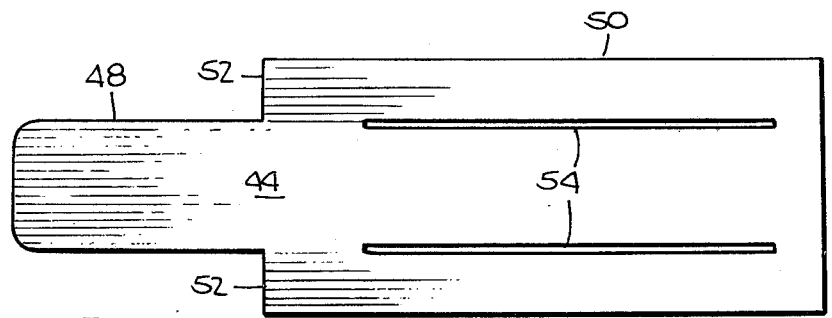
Fig. 7.
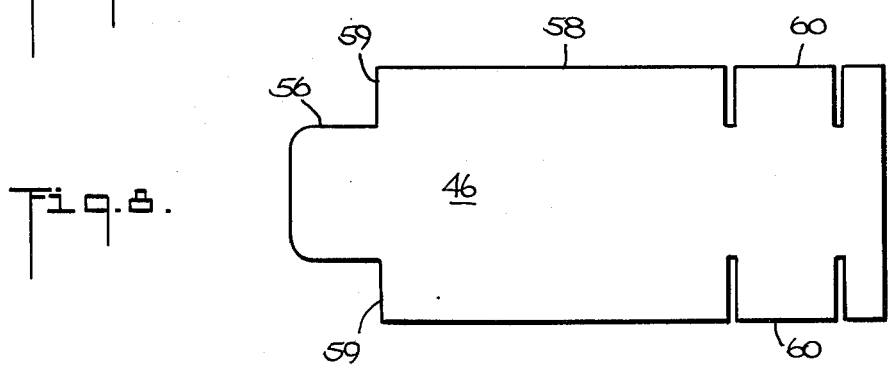
Fig. 8.
Fig. 9.
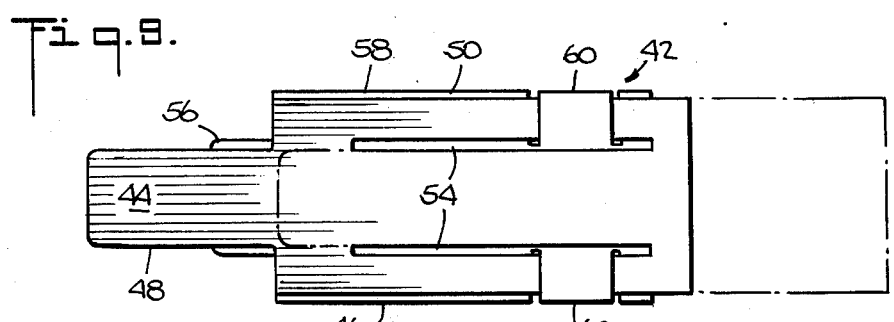
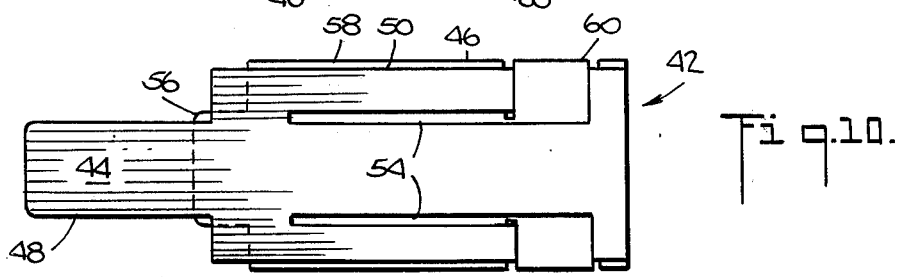
Fig. 10.
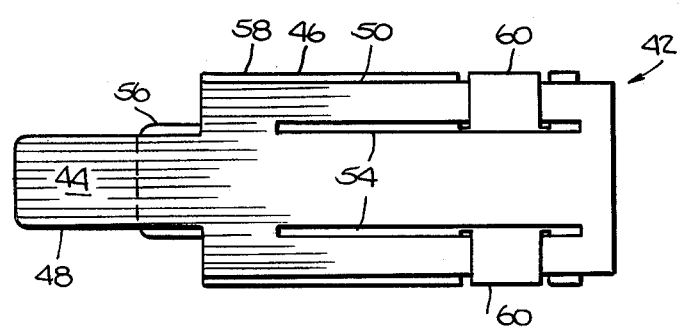
Fig. 11.

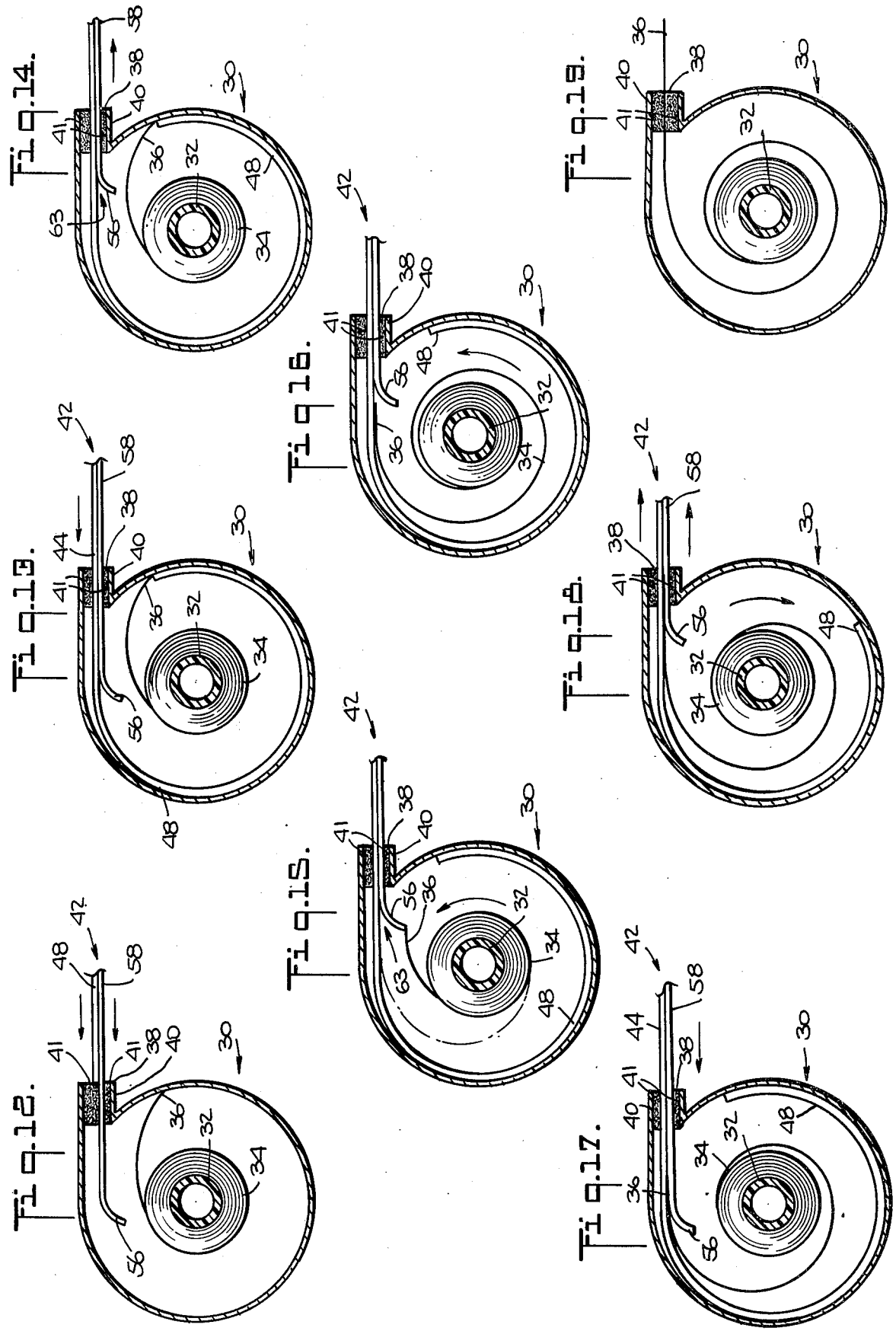

nent fully re-advanced into the cassette, as depicted in FIG. 11, and the film trapped between the upper and lower components;

FIG. 18 is an enlarged, central, vertical, sectional view similar to FIG. 17 but showing the two components being slowly withdrawn together from the cassette while the hub of the cassette is simultaneously turned clockwise; and FIG. 19 is an enlarged, central, vertical, sectional view similar to FIG. 18 but showing the end of the film emerged from the cassette.

DESCRIPTION OF THE PREFERRED EMBODIMENT

In describing the preferred embodiment of the instant invention, reference is made to the drawings, wherein there is shown a standard 35 mm photographic film cassette generally designated 30 (FIGS. 1, 4, 5 and 6). The cassette 30 includes a hub 32 protruding from one end thereof around which film 34 is convolutely wound. The film 34 includes a leader 36 (see FIG. 6) which emerges from the cassette through an exit opening 38 in the circumferential wall 40 of the cassette 30. Pieces of black velvet 41 (see FIGS. 12–19) are secured to the inner surface of the exit opening 38 for the purpose of preventing transmission of light into the cassette 30.

A film retriever, generally designated 42, best seen in FIGS. 1–3, is shown comprising two components, a first, upper, thin, flexible, springy strip of material 44 and a second, lower, thin, flexible, springy strip of material 46. The material forming the strips 44 and 46 should not transmit light, and should have sufficient strength so that the retriever can be pushed through the exit opening 38, past the pieces of velvet 41 and into the cassette 30 without buckling or breaking. The material forming strip 46 additionally should be capable of having a curl formed in one end. Despite being strong enough to be pushed through the opening 38 into the cassette 30, the strips 44 and 46 must be flexible enough to conform readily to the cylindrical interior wall surface of the cassette 30. Preferred materials for forming the retriever are plastics, particularly cellulosics, polyvinyl chloride and copolymers thereof, polyesters, e.g., Mylar ®, polyurethanes, etc.

Each of the two strips 44 and 46 should be about 0.002 to about 0.020 inch thick, about 0.010 inch being preferred, so that the combined thickness of the two strips is between about 0.004 and 0.040 inch, depending on the characteristics of the particular material being used, about 0.020 inch being preferred. The spacing of the exit opening 38 is normally on the order of about 0.1 inch (the black velvet occupying this space to prevent light transmission), so that the 0.004 to 0.040 inch thick retriever easily passes through the exit opening 38.

The upper component 44 of the retriever 42 includes an anterior tongue portion 48 having a length slightly less than the circumference of the cylindrical interior wall surface of the cassette 30, and a wider, longer posterior portion 50 having a pair of shoulders 52 and a pair of spaced, parallel slots 54.

The lower component 46 of the retriever 42 includes a curled, anterior tongue portion 56 having a length slightly less than the diameter of the cylindrical interior wall surface of the cassette 30. The lower component 46 further includes a wider, longer, posterior portion 58 which includes a pair of shoulders 59 and a pair of tabs 60 hingedly connected thereon (see FIG. 3).

Each of the tabs 60 is inserted upwardly into one of the two slots 54 so that the two components of the retriever may slide longitudinally back and forth with respect to each other (see FIG. 2). To operate the retriever 42 for the purpose of extracting the free end of a film or a film leader wound all the way into the cassette 30, the upper component 44 is slid back on the lower component 46 until the tabs 60 reach the anterior ends of the slots 54 (see FIG. 2). The curled, anterior tongue portion 56 of the lower component 46 is inserted into the cassette 30 through the exit opening 38 between the pieces of black velvet 41 until the shoulders 56 of the lower component 46 stop its advance (see FIGS. 4 and 12). The anterior tongue portion 48 of the upper component 44 is then similarly advanced into the cassette 30 until stopped by its shoulders 52 (see FIGS. 5, 9 and 13).

The lower component 46 is then withdrawn until its tabs 60 reach the posterior ends of the slots 54 in the upper component 44 (see FIGS. 10 and 14). As best seen in FIG. 14, a V-shaped channel 63 is formed adjacent the exit opening 38 for capturing the film leader 36. Subsequently, the protruding hub 32 of the cassette 30 is slowly turned counterclockwise (see FIG. 15) until an audible snap is heard, which indicates that the end of the film leader 36 has just passed the tip of the curled, anterior tongue portion 56 of the lower component 46 and has snapped onto the lower surface of the anterior tongue portion 48 of the upper component 44 (see FIG. 16).

The protruding hub 32 is then turned clockwise until it can no longer be turned. The lower component 46 is advanced again into the cassette 30 until stopped by its shoulders 56, thereby trapping the film leader 36 between the two anterior tongue portions 48 and 56 (see FIGS. 11 and 17). The upper component 44 and lower component 46 are subsequently slowly withdrawn together while the protruding hub 32 is simultaneously turned clockwise, keeping the end of the film leader 36 ,etween the two anterior tongue portions 48 and 56 (see FIG. 18). These simultaneous actions carry the end of the film leader 36 past the exit opening 38 and out of the cassette 30 (see FIG. 19), so that the end of the film leader 36 is available for threading into a camera. The entire procedure should take less than a minute.

A retriever has been constructed in which the upper and lower components 44 and 46 are both 2½ inches wide, the upper component 44 having an overall length of 8 inches and the lower component 46 having an overall length of 5⅝ inches. The anterior, tongue portion 48 of the upper component 44 is 2½ inches long and 1¼ inches wide, while the curled, anterior, tongue portion 56 of the lower component 46 is ⅞ inch long and 1¼ inches wide. The slots 54 in the upper component 44 are 1/32 inch wide and extend 4 inches in length starting 1 inch from the shoulders 52. The slots 54 are centered in the posterior portion 50 and are spaced 1¼ inch from each other. The tabs 60 of the lower component 46 are each ⅝ inch wide and extend one inch, starting 3½ inches from the shoulders 59.

Various modifications and changes are contemplated and may obviously be resorted to, without departing from the spirit or scope of the invention as hereinafter defined by the appended claims.

What is claimed is:

1. A film retriever for retrieving a free end of a convolutely wound film from inside a cylindrical cassette

FILM RETRIEVAL DEVICE

BACKGROUND OF THE INVENTION

The instant invention relates to a film retrieval device, and more particularly to a two-part film retrieval device and a method for retrieving the free end of a film from a cassette.

The conventional film magazine or cassette, such as a 35 mm photographic film cassette used in a standard 35 mm still camera, transmits no light, is substantially cylindrical in configuration and includes closed ends. A longitudinally extending slot forming a film passageway is provided through the cylindrical wall of the magazine. The passageway is usually lined with two pieces of black velvet whose surfaces touch. A length of film leader extends from the slot of a film-loaded cassette to permit the photographer to connect the film from the cassette to the camera takeup spools that successive film frames may be advanced into position over the exposure aperture. If the leader accidentally or purposely becomes wound all the way into the cassette, the cassette and film are virtually useless because presently there is no device available commercially for retrieving the film leader without destroying either the cassette or the film.

U.S. Pat. No. 3,261,237, issued July 19, 1966, discloses a film retrieval device which results in the leader being pulled out from the cassette partially folded. U.S. Pat. No. 3,864,993, issued Feb. 11, 1975, also discloses a film retrieval device for cassettes, but the device is complicated by the use of an adhesive. The instant invention overcomes the disadvantages of the prior art devices by providing a film retrieval device and method which pull out the free end unfolded and without the need for a film leader or any adhesive.

SUMMARY OF THE INVENTION

Accordingly, the instant invention provides a film retriever for retrieving a free end of a convolutely wound film from inside a cylindrical cassette through an exit opening in a circumferential wall on said cassette. The retriever comprises a first, upper, thin flexible, springy strip of material having an anterior tongue portion of a length slightly less than the interior circumference of the cassette and a wider, longer posterior portion, said posterior portion having a pair of spaced, parallel slots, and a second, lower, thin, flexible, springy strip of material having a curled, anterior tongue portion of a length slightly less than the interior diameter of the cassette and a wider, longer posterior portion having tabs therein which slidingly engage the slots of the first posterior portion.

The instant invention also provides a method of retrieving a free end of a convolutely wound film from inside a cylindrical cassette through an exit opening in a circumferential wall on said cassette. The method comprises inserting a two-part retrieval device into the cassette through the exit opening, said retrieval device having an upper and lower component which slidingly engage each other in a longitudinal direction, said upper component having an anterior tongue portion and said lower component having a curled, anterior tongue portion, arranging the components with the cassette so that the upper component lies adjacent most of the interior cylindrical wall of cassette while the curled, anterior tongue portion of the lower component forms a film-receiving channel with the upper component adjacent the exit opening, rotating the protruding hub of the cassette counterclockwise until the free end of the film passes the end of the curled, anterior tongue portion, rotating the protruding hub clockwise until said hub can no longer be turned and then withdrawing the upper and lower components while simultaneously turning the protruding hub clockwise.

BRIEF DESCRIPTION OF THE DRAWINGS

FIG. 1 is an enlarged, perspective view of a photographic film cassette and the film retrieval device of the instant invention;

FIG. 2 is a perspective view of the retrieval device shown in FIG. 1 and depicts the positions of the upper and lower components of the device prior to insertion into the cassette;

FIG. 3 is a perspective view showing the two component parts of the retrieval device;

FIG. 4 is a perspective view showing the lower component of the retrieval device engaging the film cassette while the upper component of the retrieval device is in a retracted position;

FIG. 5 is a perspective view showing both the upper and lower components of the retrieval device engaging the film cassette;

FIG. 6 is a perspective view showing the film cassette with the film leader exposed;

FIG. 7 is an enlarged, top plan view, to scale, of the upper component of the film retrieval device;

FIG. 8 is an enlarged, top plan view, to scale, of the lower component of the film retrieval device.

FIGS. 9–11, the lower component of the retrieval device is shown wider than the upper component for purposes of clarity and illustration only.

FIG. 9 is a top plan view of the retrieval device showing the position of the upper and lower components when both components are fully inserted into the cassette; the broken line indicates the positions of the components prior to insertion, as seen in FIG. 2;

FIG. 10 is a top plan view of the retrieval device showing the lower component completely retracted in the slots of the upper component;

FIG. 11 is a top plan of the retrieval device showing the upper component re-advanced into the cassette, as earlier depicted in FIG. 9;

FIG. 12 is an enlarged, central, vertical, sectional view perpendicular to the axis of the cassette showing the lower component fully inserted in the cassette, as depicted in FIG. 4;

FIG. 13 is an enlarged, central, vertical, sectional view perpendicular to the axis of the cassette showing the upper as well as lower component fully inserted in the cassette, as depicted in FIGS. 5 and 9;

FIG. 14 is an enlarged, central, vertical, sectional view similar to FIG. 12 but showing the lower component retracted in the slots of the upper component, as depicted in FIG. 10;

FIG. 15 is an enlarged, central, vertical, sectional view similar to FIG. 14 but showing the hub of the cassette being slowly turned counterclockwise so that the end of the film leader may pass the end of the lower component;

FIG. 16 is an enlarged, central, vertical, sectional view similar to FIG. 15, but showing the hub of the cassette being wound counterclockwise until the end of the film leader has passed the end of the lower component;

FIG. 17 is an enlarged, central, vertical, sectional view similar to FIG. 16 but showing the lower compothrough an exit opening in a circumferential wall on said cassette, comprising:
- a first, upper, thin, flexible, springy strip of material having an anterior tongue portion of a length slightly less than the interior circumference of the cassette and a wider, longer posterior portion, said posterior portion having a pair of spaced, parallel slots; and
- a second, lower, thin, flexible, springy strip of material having a curled, anterior tongue portion of a length slightly less than the interior diameter of the cassette and a wider, longer posterior portion having tabs therein which slidingly engage the slots of the first posterior portion.

2. The retriever of claim 1, wherein the first and second strips of material are opaque.

3. The retriever of claim 2, wherein the first and second strips of material are plastics.

4. The retriever of claim 2, wherein the combined thickness of the first and second strips of material is between about 0.004 and 0.040 inch.

5. The retriever of claim 2, wherein the first and second strips of material are each about 2½ inches wide, the first strip being about 8 inches long and the second strip being about 5½ inches long.

6. The retriever of claim 5, wherein the anterior tongue portion of the first strip is about 2¼ inches long and 1¼ inches wide and the curled, anterior tongue portion of the second strip is about ⅞ inch long and 1¼ inches wide.

7. A method of retrieving a free end of a convolutely wound film from inside a cylindrical cassette through an exit opening in a circumferential wall on said cassette, comprising:
- (a) inserting a two-part retrieval device into the cassette through the exit opening, said retrieval device having an upper and lower component which slidingly engage each other in a longitudinal direction, said upper component having an anterior tongue portion and said lower component having a curled, anterior tongue portion;
- (b) arranging the components with the cassette so that the upper component lies adjacent most of the interior cylindrical wall of the cassette, while the curled anterior tongue portion of the lower component forms a film-receiving channel with the upper component adjacent the exit opening;
- (c) rotating the protruding hub of the cassette counterclockwise until the end of the film leader passes the end of the curled, anterior tongue portion;
- (d) rotating the protruding hub clockwise until said hub can no longer be turned; and
- (e) then withdrawing the upper and lower components while simultaneoulsy turning the protruding hub clockwise.

8. The method of claim 7, wherein the insertion step (a) comprises first fully inserting the curled, anterior tongue portion of the lower component and then sliding the upper component along the lower component until the anterior tongue portion of the upper component is fully inserted in the cassette.

9. The method of claim 8, wherein the anterior tongue portion of the upper component has a length slightly less than the interior circumference of the cassette and wherein the curled, anterior tongue portion of the lower component has a length slightly less than the interior diameter of the cassette.

10. The method of claim 9, wherein the upper component has a posterior portion which is wider and longer than the anterior portion of the upper component, and wherein the lower component has a posterior portion which is wider and longer than the anterior portion of the lower component.

* * * * *